July 30, 1963  J. D. ROBERTSON ETAL  3,099,072
TABLE ROLL WITH MEANS FOR REMOVING LONGITUDINAL CURVATURE
Filed June 31, 1961
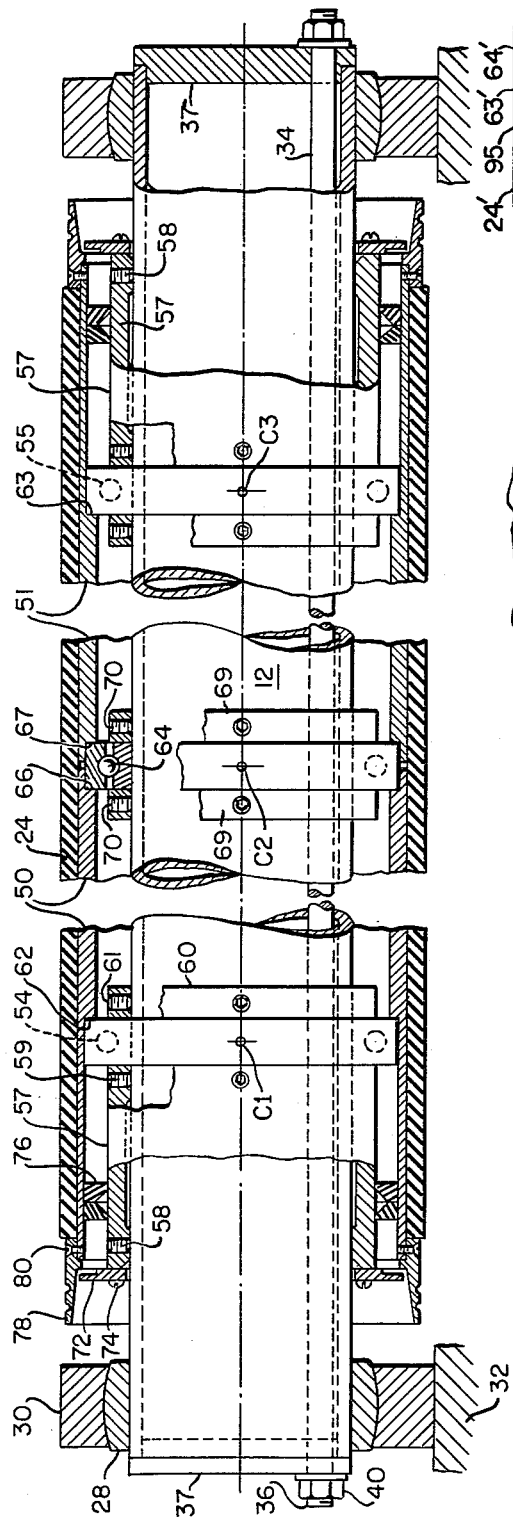
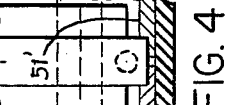
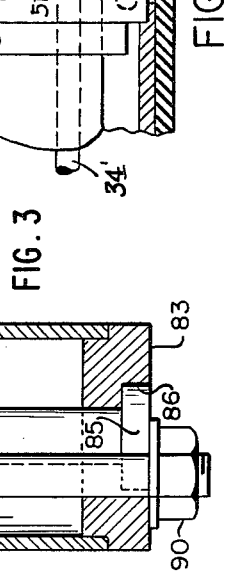
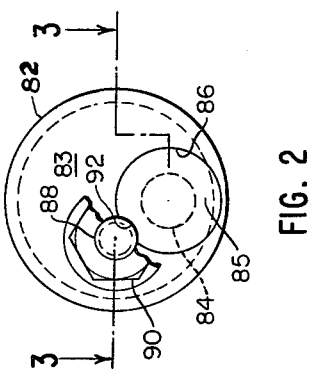
INVENTORS
JOHN D. ROBERTSON
GEORGE P. KNAPP
BY
*Kenway, Jenney & Hildreth*
ATTORNEYS

United States Patent Office 3,099,072
Patented July 30, 1963

3,099,072
TABLE ROLL WITH MEANS FOR REMOVING LONGITUDINAL CURVATURE
John D. Robertson, Taunton, and George P. Knapp, Waban, Mass., assignors to Mount Hope Machinery Company, Taunton, Mass., a corporation of Massachusetts
Filed June 13, 1961, Ser. No. 116,849
4 Claims. (Cl. 29—116)

This invention relates in general to web-supporting rolls, and more particularly to an improvement in table rolls of the kind described and claimed in an application of John D. Robertson entitled, "Table Roll with Means for Removing Longitudinal Curvature," Serial No. 120,-125, filed June 13, 1961. That application is a continuation-in-part of application Serial No. 44,455, entitled, "Roll of Adjustable Longitudinal Axis," filed July 21, 1960.

In the aforementioned application of John D. Robertson, a table roll is described which has adjustable means for removing transverse deflection or curvature induced in the roll by its own weight, by a load carried on the roll, and by manufacturing error or "runout." The roll described comprises a stationary support of longitudinally-uniform cross-section, preferably formed as a hollow cylinder, which is mounted at its ends in a horizontal attitude to support an annular sleeve rotatably thereon. A tension rod extends longitudinally through the support eccentrically of a longitudinal axis thereof, and has means for applying an adjustable compression to the support to remove any longitudinal curvature therefrom. According to the invention, the sleeve is mounted upon a plurality of annular spools each supported by a bearing assembly on the tubular support. In order to correct deflection of the sleeve caused by runout as well as the weight of the roll and its load, it is necessary to locate a principal plane of the curvature defined by the centers of all of the bearings of the spools, to position the support with this plane of curvature extending vertically, and to locate the tension rod below the axis of the support in this plane. In this manner, the deflection or sag arising from load and from runout lies substantially in a common vertical plane, so that it may be corrected by the tension rod.

However, we have found in actual practice that all of the centers of the various bearings may not lie in a common plane of support curvature, with the result that the correction applied by the tension rod is not absolutely effective, although it does provide a substantial straightening of the support. In applications in which high rotational speeds are encountered, and in which long rolls are employed, such as in Fourdrinier paper-making machines, even a minor misalignment of the various bearings and spools may result in substantial vibration and binding of the roll. In extreme cases, stress concentrations in the sleeve at the gaps between adjacent spools may rupture a relatively brittle and rigid sleeve material, such as fiberglass or hard rubber.

It is the primary object of the present invention to provide an improvement in a table roll construction of the type described by the aforementioned co-pending application of John D. Robertson, with means by which longitudinal curvature may be more perfectly removed.

It is another object of the present invention to provide an improved table roll from which longitudinal curvature may be removed by aligning only three points, which inherently lie in only a single plane of curvature.

It is a further object of the invention to provide an improved table roll having, in addition to means for removing longitudinal curvature lying in a principal plane, means for removing residual curvature lying in a perpendicular plane, which may result from a minor error in locating the principal plane of curvature.

It is still a further object of the invention to provide an improved table roll having means not only for removing longitudinal curvature, but also for reducing dynamic imbalance and vibration of the roll.

Briefly stated, according to a preferred embodiment thereof, the invention may be carried out by providing a stationary support having an outer sleeve rotatably mounted thereon by means of only two annular spools, each extending substantially half the length of the sleeve and confronting in axially-spaced relation at its center; each of the two spools is mounted upon one bearing spaced at one end thereof or intermediate its ends, and upon a third bearing at the center of the roll, which supports the axially-confronting ends of both of the spools in common. It should be noted that because of the length of the spools, it would not be feasible to mount each spool upon a single bearing. This arrangement of two spools upon only three bearings causes the location of the major plane of curvature, defined by the curved axis connecting the centers of the bearings, to be precisely determined by only three points. Curvature of the support intermediate these points does not affect the true axial alignment of the axis of rotation of the sleeve. More effective correction of the curvature of the support may be achieved by this arrangement, since the use of a larger number of sleeve rolls, each having a bearing, requires that the location of the plane of curvature be approximated on the basis of the centers of bearings at more than three axially-spaced points.

As in the aforementioned co-pending application of John D. Robertson, the support has substantially the same cross-section throughout its length, i.e., is of longitudinally-uniform cross-section, and preferably comprises a hollow cylinder of substantially uniform wall thickness. This configuration affords a maximum of rigidity against transverse deflection for a given diameter and weight of support. A tension rod extends lengthwise interiorly through the support and through abutments placed in its ends, and is parallel to but spaced vertically beneath a longitudinal axis of the support. The support is rotated to a position in which the plane of curvature extends vertically through the tension rod, with the curve defined by the three centers of the bearings lying convex downwardly in the plane. Adjustment of nuts threaded on the ends of the rod may then be carried out to eccentrically compress the support into a straight condition, such that the three centers lie on a single rectilinear axis when the desired load is applied.

The foregoing embodiment is effective to straighten the roll with respect to a plane of curvature of at least three points spaced therealong. However, some residual curvature of a relatively minor order of magnitude may persist in a perpendicular plane, because of error in locating the plane of curvature. For installations in which this residual curvature is critical, the structure may be dimensioned so that the bearings are somewhat loosely received on the support; locking rings are arranged to adjustably support the bearings eccentrically of the support axis, so that a minor adjustment may be performed to remove the residual curvature in the perpendicular plane, following the adjustment of the tension rod to remove curvature in the principal plane defined by the centers of the bearings.

In a modified embodiment, a second tension rod extends parallel to the first, lying in the perpendicular plane for adjustment to remove the residual curvature subsequent to the adjustment of the primary tension rod.

Further objects and advantages of the invention will become apparent from the following detailed description of a preferred embodiment of the invention, referring to the accompanying drawings, in which:

FIG. 1 is a longitudinal elevation in section of a preferred embodiment of the improved roll;

FIG. 2 is an end view of a modified support; and

FIG. 3 is a sectional view taken along line 3—3 in FIG. 2, looking in the direction of the arrows, and showing a fragmentary portion of the support.

FIG. 4 is a fragmentary sectional view of a modification of the roll of FIG. 1.

Referring to FIG. 1, there is shown a preferred embodiment of the improved roll. Two annular spools 50 and 51 are axially-spaced about a tubular support 12, each extending substantially half the length of the support. The spools are supported by bearings 54 and 55, respectively, which are preferably located intermediate the ends of a sleeve 24 received about the spools, to minimize its static deflection due to gravity. The sleeve 24 is preferably formed of a corrosion-resistant, hard, and moderately resilient material such as fiberglass or hard rubber.

The bearings are located axially upon the support by annular spacer rings 57, secured by set screws 58 and 59 spaced circumferentially thereabout, and by locking rings 60 secured by circumferentially-spaced set screws 61. The bearings are received against shoulders 62 and 63 formed about the interior surfaces of the spools.

The spools 50 and 51 terminate in axially-spaced relation about a third bearing 64, and are formed with annular recesses 66 and 67, respectively, for their axial location by the bearing, in cooperation with the bearings 54 and 55 and the shoulders 62 and 63. The bearing 64 is positioned at the center of the support 12 by locking rings 69, secured by set screws 70.

The ends of the roll are provided with annular shields 72 secured to the spacers 57 by screws 74, and with flexible sealing rings 76 interposed between the spacers and the spools, to prevent the ingress of dust or other foreign material to the bearings. Annular end caps 78 are secured upon the ends of the two spools protruding from the sleeve 24, by means of screws 80, to locate the sleeve in a positive manner on the spools.

The support 12 is of a hollow cylindrical cross-section which is longitudinally uniform and free of discontinuities. The end portions of the support 12 extend through and are supported by spherical bearing elements 28 which are mounted for relative canting movement of the support within bearing members 30 on fixed supports 32. When the center of the roll is deflected upwardly in an unloaded condition, the end portions cant downwardly slightly with respect to the longitudinal axis of the roll. However, the deflection is very slight, and is removed by a load during actual use of the roll; plain cylindrical supports may therefore be substituted if desired.

Extending lengthwise through the support 12 is a tension rod 34 having threaded end portions 36. Stout abutments or end plates 37 are received in opposite ends of the support, and are provided with aligned openings to receive the end portions of the rod 34. It will be noted that these openings are formed eccentrically in the abutments so that the rod will be arranged parallel to, but spaced vertically beneath, the longitudinal axis of the roll. A pair of washers 38 and 40 engage the ends of the rod and are tensioned against the abutments. By tightening the nuts 40, the rod 34 may be subjected to increasing tension, and the support may be placed under an eccentric longitudinal compressive force. This force is used to remove longitudinal curvature from the roll.

The plane of the as-manufactured curvature or "runout" of the support is determined by the three centers of symmetry C1, C2 and C3 at the axial locations of the the bearings, and the roll is subsequently mounted horizontally with this plane extending vertically, and the curvature in an upwardly concave orientation. Subsequent tensioning of the rod 34 causes the roll to become axially straight, in that the three centers are brought to a common rectilinear axis. Since any curvature of the support intermediate the bearing locations does not affect the rectilinearity of the axis of rotation of the sleeve and spools, a more effective correction of runout is achieved by this arrangement than one in which a larger number of spools having individual bearings are employed.

It is to be noted that following the assembly of the roll, but before the sleeve is applied, the roll may be dynamically balanced in an effective manner by the attachment of balancing weights at either end of each of the spools. The radial directions of any remaining forces of dynamic imbalance, after the balancing weights are attached, may be determined for the confronting ends of the two spools in a well-known manner; the spools are then relatively rotated to oppose these forces 180° apart, to balance the roll even more effectively.

In the event that the sleeve is made of a rigid and brittle material which will not withstand substantial elongation, such as fiberglass or hard rubber, it may be desirable to provide means for eliminating any residual curvature in a plane perpendicular to the principal plane of curvature defined by the centers of the three bearings. Such residual curvature will appear if there is any substantial error in the location of the principal plane of curvature. A rigid sleeve will tend to produce an additional loading of the bearings if they are not centered on a straight axis, and will experience a high concentration of stress at the joint between the spools. In an extreme case of curvature, the sleeve may bind and not be rotatable, and will at the least produce a radial force vector which will rotate with the sleeve to produce an objectionable or even destructive vibration.

A modification is shown in FIGS. 2 and 3 having means by which the residual curvature previously referred to may be conveniently removed. In this embodiment, a support 82 is provided with abutments 83, and with a primary tension rod 84 which serves the same purpose as the tension rod 34 in the embodiment of FIG. 1. The tension rod is conveniently formed at the end shown with a flat head 85 received in a recess 86 of the abutment 83; the opposite end of the tension rod is provided with a tensioning nut (not shown) as in the previous embodiment. The primary tension rod 84 is arranged to lie along the principal plane of curvature defined by three bearings spaced thereon (not shown). A secondary tension rod 88 is extended through the sleeve and the abutments, parallel to the primary tension rod, and lies in a perpendicular diametral plane of the support. Nut 90 is threaded on the end shown of the rod 88, overlying the abutment 83. The head 85 is retained against rotation by the interference therewith of the secondary tension rod 88, which is arranged to extend through an arcuate recess 92 formed in the head. The other end of rod 88 terminates in an enlarged cylindrical head (not shown) which is set flush with the end of the corresponding abutment and notched to pass bolt 84; thus preventing rotation of rod 88 in a manner analogous to that for the end shown in FIG. 2. The primary tension rod 84 is first adjusted by means of its tensioning nut to straighten the support in the principal plane of curvature. Following this operation, the nut 90 is adjusted to remove any residual curvature lying in the perpendicular plane.

It should be noted that the secondary tension rod is to be arranged in the horizontal plane on that side of the longitudinal axis of the roll toward which the residual longitudinal curvature is bowed and presents a convex form. The invention contemplates that for convenience in the adjustment, a further secondary tension rod may extend longitudinally through the support in the horizontal plane, but spaced across the longitudinal axis from the first rod 88. This arrangement permits either of the secondary tension rods to be tensioned, according to the direction of bow of the residual curvature in the horizontal plane. Furthermore, the two secondary tension rods may be differentially tensioned to correct the residual curvature, and will then serve to further stiffen the support against horizontal deflection. It should also be noted that the occurrence of residual curvature is occasioned by minor error in the location of the primary tension rod 84, so that it lies only approximately centered in the plane of principal curvature defined by the centers of the bearings.

In FIG. 4 there is shown a modified form of the roll of FIG. 1 having other means for eliminating the relatively minor residual curvature which may persist in an axis connecting the three centers of the bearings, lying in a longitudinal plane approximately perpendicular to the major plane of curvature. Parts similar to those of FIG. 1 are similarly numbered, with prime superscripts.

The bearings, of which the center bearing 64' is shown by way of example, are loosely received on the support 12' and are radially located by means of annular flanges 95 formed about the confronting axial surfaces of the rings 69'. These flanges are received in mating annular recesses formed about the inner bearing race. Similar flanges are provided in the remaining rings to position the other bearings. Following the adjustment of the tension rod 34' to eliminate the principal curvature, the set screws of the various rings, such as 70', may be adjusted to move the bearings parallel to the perpendicular plane the necessary direction and extent.

It is to be understood that the foregoing description of preferred embodiments of the invention is given for purposes of illustration, and that various changes and modifications may be made without departing from the true spirit and scope of the invention, which we intend to define in the appended claims.

What we claim and desire to secure by Letters Patent of the United States is:

1. A roll comprising a tubular support having a longitudinally uniform and substantially symmetrical cross-section, means mounting said support horizontally, a pair of axially-spaced annular spools circumferentially spaced about said support, an annular sleeve received about said pair of spools for rotation therewith, first and second bearings each mounting one of said spools on said support, a third bearing supporting the axially-confronting ends of both of said spools on said support, said spools being of continuous and uninterrupted cross section over their full lengths to support said sleeve against transverse sagging intermediate said bearings, said bearings being adapted to mount said spools and said sleeve for rotation about a rectilinear axis, a rod extending longitudinally and interiorly through said support eccentrically of said axis, said support being subject to longitudinal curvature such that the centers of said bearings lie along a curved line in a plane of curvature defined by the centers of said bearings, said rod being positioned in said support to lie along said plane of curvature, the end portions of said support being provided with means for tensioning said rod and applying the compressional reaction eccentrically to said support to align the centers of said bearings on said axis.

2. A roll as recited in claim 1, together with at least one further tension rod extending longitudinally and interiorly through said support eccentrically of said axis, said further rod being positioned to lie along a longitudinal plane other than said plane of curvature, the end portions of said support being provided with further means for tensioning said further rod and applying the compressional reaction eccentrically to said support to eliminate residual longitudinal curvature in said further plane.

3. A roll as recited in claim 1 in which said bearing units are loosely received about said support, together with a plurality of rings received upon said support and having circumferentially spaced set screws threaded therein for locking engagement with said support, each of said bearing units being axially interposed on said support between a pair of said rings to be secured thereby in radially adjusted position with respect to said support, whereby said set screws may be adjusted to eliminate residual longitudinal curvature in a longitudinal plane other than said plane of curvature.

4. A roll comprising a tubular support having a longitudinally uniform and substantially symmetrical cross-section, means mounting said support horizontally, a pair of axially-spaced annular spools circumferentially spaced about said support, an annular sleeve received about said pair of spools for rotation therewith, first and second bearing units each rotatably mounting one of said spools on said support, a third bearing unit rotatably supporting the axially-confronting ends of both of said spools on said support, said spools being of continuous and uninterrupted cross section over their full lengths to support said sleeve against transverse sagging intermediate said bearings, a pair of abutments engaging the opposite ends of said support, said bearings being adapted to mount said spools and said sleeve for rotation about a rectilinear axis, and a rod extending longitudinally through said support and said abutments eccentrically of said axis, said support being subject to longitudinal curvature such that the centers of said bearings lie along a curved line in a plane of curvature defined by the centers of said bearings, said rod being positioned in said support to lie along said plane of curvature, and means engaging the end portions of said rod protruding from said abutments for tensioning said rod and applying the compressional reaction through said abutments eccentrically to said support to align the centers of said bearings on said axis.

References Cited in the file of this patent
UNITED STATES PATENTS
2,952,889     Hanssen _____ Sept. 20, 1960